Sept. 13, 1960     A. M. MARKS ET AL     2,952,182

METHOD FOR PRODUCING APPARENT THREE DIMENSIONAL IMAGES

Filed Aug. 18, 1954     5 Sheets-Sheet 1

INVENTORS
ALVIN M. MARKS
MORTIMER M. MARKS
SATIRIS G. FASSOULIS

George Wadsley
ATTORNEY

Sept. 13, 1960 A. M. MARKS ET AL 2,952,182
METHOD FOR PRODUCING APPARENT THREE DIMENSIONAL IMAGES
Filed Aug. 18, 1954 5 Sheets-Sheet 2
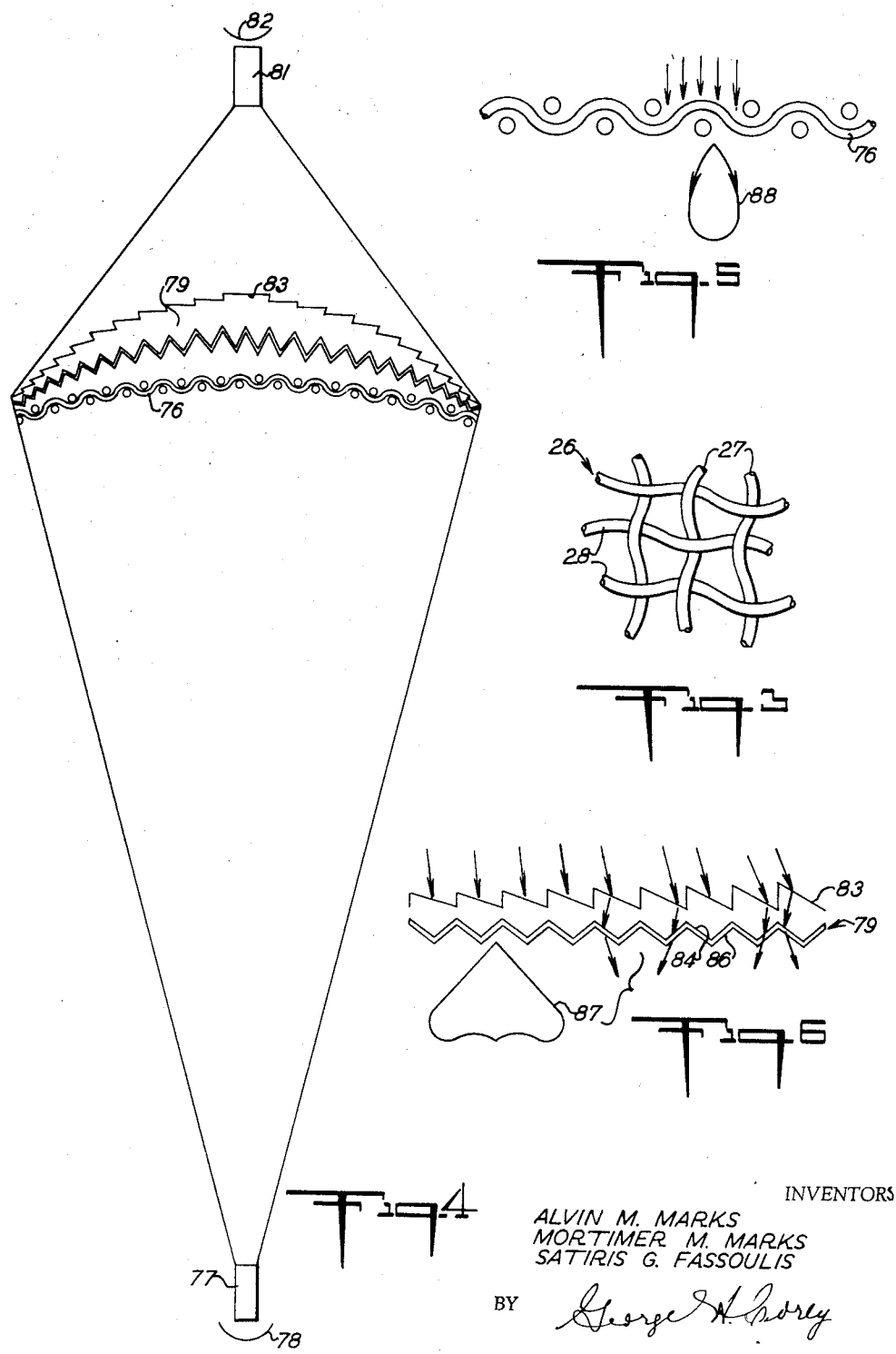
INVENTORS
ALVIN M. MARKS
MORTIMER M. MARKS
SATIRIS G. FASSOULIS
BY George H. Morey Sept. 13, 1960   A. M. MARKS ET AL   2,952,182
METHOD FOR PRODUCING APPARENT THREE DIMENSIONAL IMAGES
Filed Aug. 18, 1954   5 Sheets-Sheet 3
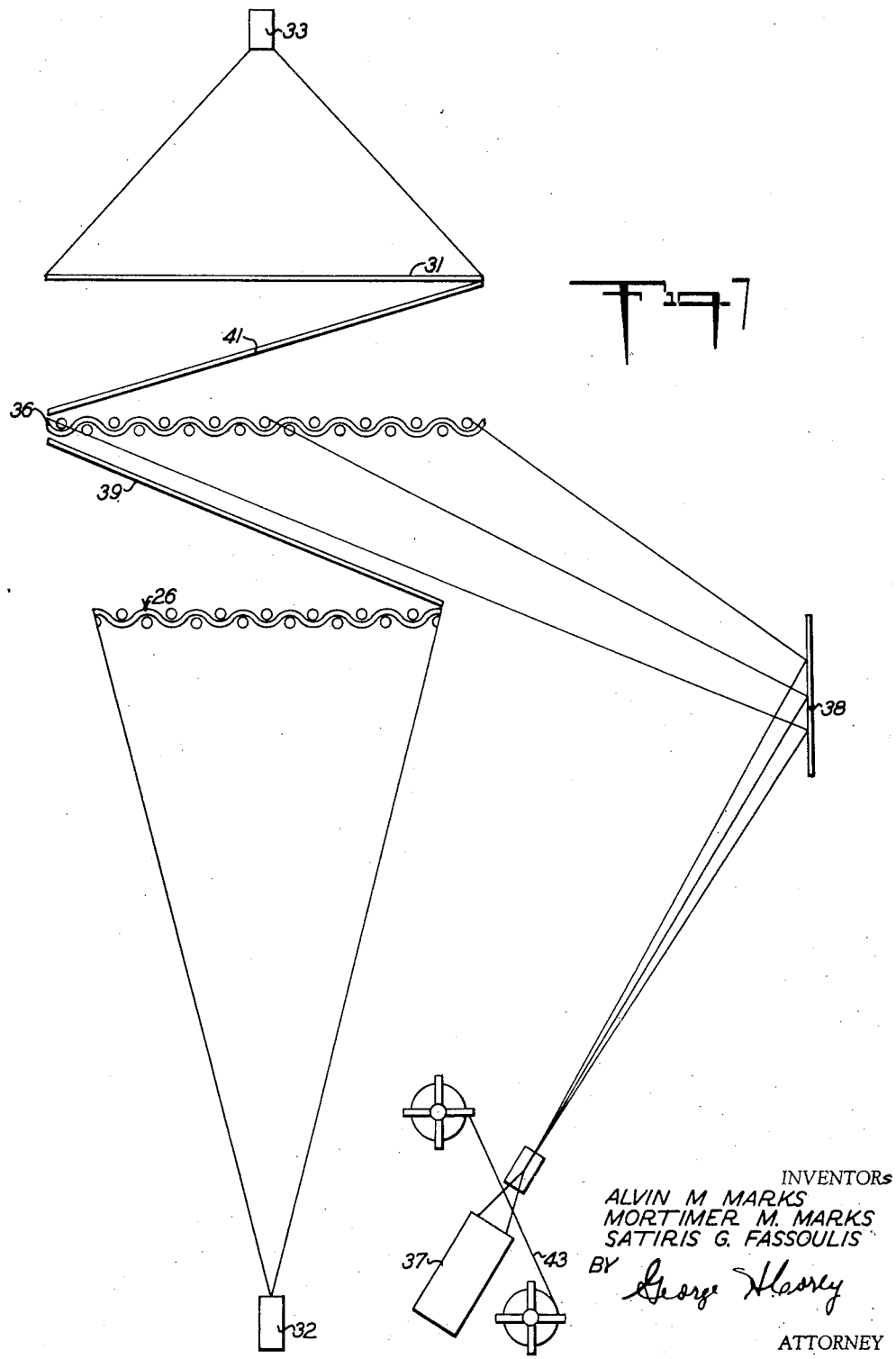
INVENTORS
ALVIN M MARKS
MORTIMER M. MARKS
SATIRIS G. FASSOULIS
BY George Hasley
ATTORNEY Sept. 13, 1960 A. M. MARKS ET AL 2,952,182
METHOD FOR PRODUCING APPARENT THREE DIMENSIONAL IMAGES
Filed Aug. 18, 1954 5 Sheets-Sheet 4
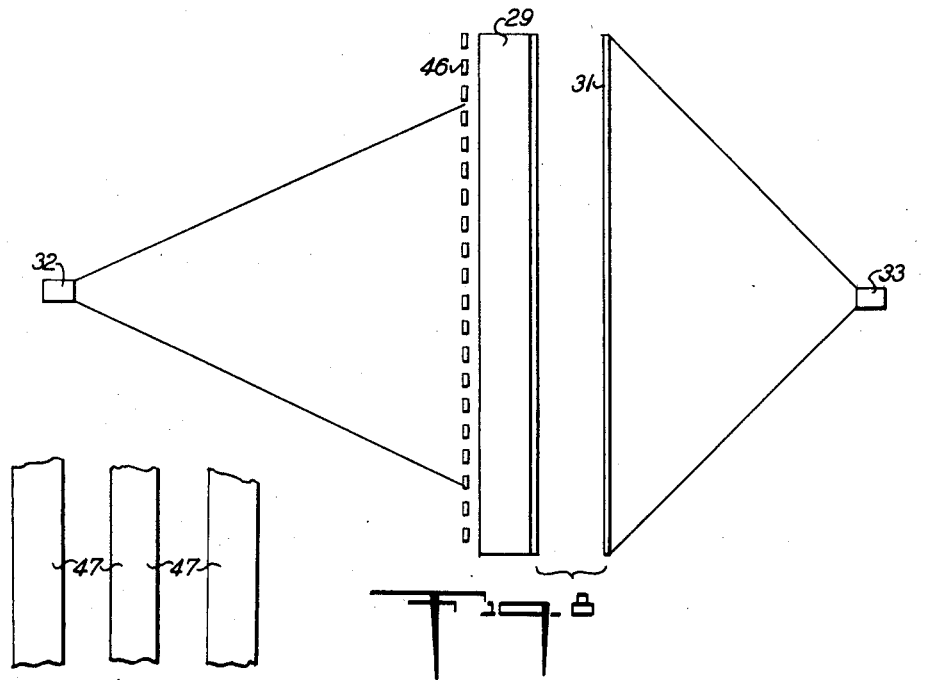
Fig. 8
Fig. 9
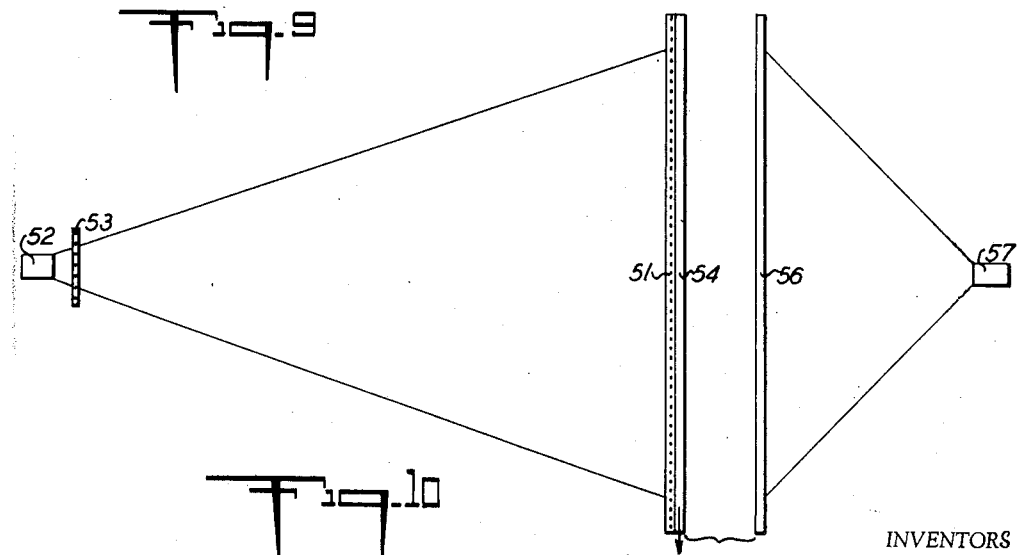
Fig. 10
INVENTORS
ALVIN M. MARKS
MORTIMER M. MARKS
SATIRIS G. FASSOULIS
BY George N. Cabrey
ATTORNEY

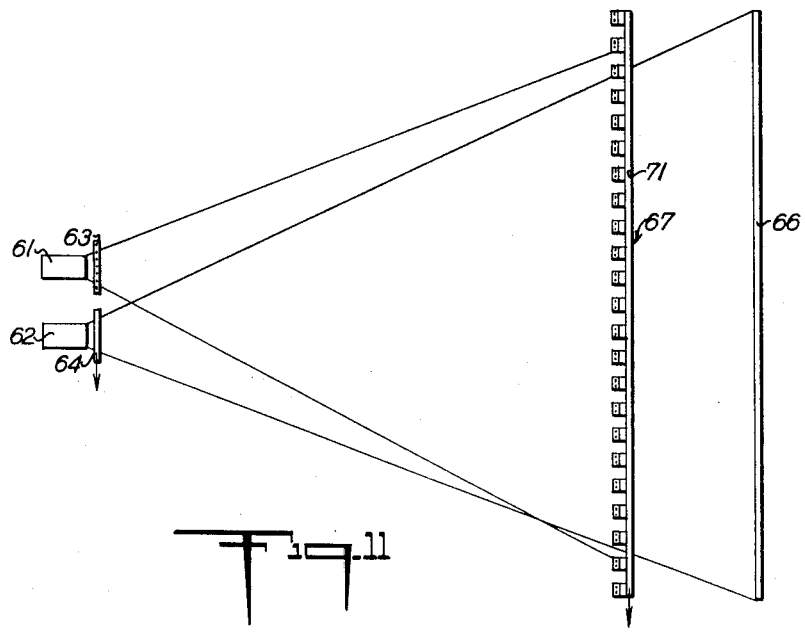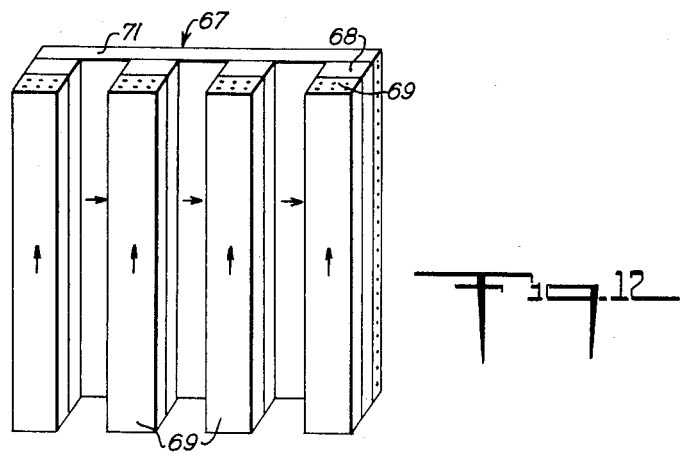

United States Patent Office 2,952,182
Patented Sept. 13, 1960

2,952,182

METHOD FOR PRODUCING APPARENT THREE DIMENSIONAL IMAGES

Alvin M. Marks, Whitestone, N.Y.; Mortimer M. Marks, 166—25 Cryders Lane, Beechhurst, N.Y.; and Satiris G. Fassoulis, Clifton, N.J.; assignors, by direct and mesne assignments, to said Mortimer M. Marks Filed Aug. 18, 1954, Ser. No. 450,726

13 Claims. (Cl. 88—16.6)

This invention relates to new and useful improvements in the projection of images having apparent as well as actual three dimensional characteristics in the eyes of the viewer and more particularly seeks to provide a system of projecting a plurality of different but related images to associated spaced reflecting screens in such a manner that the viewer integrates the plurality of images to give a total visual sensation which closely approximates real three dimensional vision. The invention is also concerned with the novel reflecting screens and filtering or modifying structures disclosed herein.

There has been such activity in the moving picture industry to create for viewers an illusion of depth or third dimension to the images being viewed. This has been particularly emphasized recently since television has become competitive with and made inroads on the patronage of the moving picture industry.

Thus in one group of systems the ratio of reflecting screen width has been increased relative to the screen height in order to have a picture area which more nearly corresponds with the normal visual field of the viewer which is about 3 to 1. In addition, there is a tendency to curve such screens with the idea of creating a certain amount of depth illusion.

Another system takes a pair of stereoscopic pictures, i.e., pictures photographed at different angles and these are projected simultaneously onto a screen through polarizing filters orientated at right angles to each other while an associated pair of polarizing spectacles is worn by the viewer. Each eye of the viewer thus sees only one of the images which are then combined by the brain into a single image with apparent depth.

This system of stereoscopic projection, which is commonly known as "3-D," is sometimes objected to because of the requirement that the viewers must wear special spectacles which is bothersome, uncomfortable and an additional expense.

The group of systems that tend to create a more natural or wider visual field and which are more commonly known as "Wide Screen," or by the trademarks "Cinerama," and "CinemaScope" and various other terms, do not create nearly as great an illusion of depth as the stereo systems since inherently the same view or image is seen by both eyes. The greatest illusion of these systems is probably created by the "Cinerama" system which has a width to height ratio of 2.8 to 1 and a highly curved screen. However, such a system requires a huge outlay of capital for each individual theater in constructing such a screen and also requires the projection of different related images contiguously on the various areas of the enlarged screen. Furthermore, many present theater buildings are not capable of being converted for use of this system and others cannot be converted without greatly curtailing the seating capacity of the theater. Thus "Cinerama" is limited for practical purposes to a few large theaters in large metropolitan areas because of cost of operation and theater facilities.

Objections to the remaining wider natural visual field systems range from the high cost of converting the theater to other systems which offer little improvement over the ordinary movie system which has been in use for many years. In other words, it is impossible with these systems to create as much apparent depth effect as with the "3-D" system and even in approaching the apparent depth of "3-D," the expense of the system becomes prohibitive from a competitive viewpoint.

Therefore, it is an object of this invention to produce projection systems that will create an apparent depth effect comparable to that created in the stereo systems but one not requiring the use of spectacles by the viewer.

It is another object of this invention to produce a system of the character stated that can be readily installed without great expense in most theaters now in use.

It is an additional object of this invention to produce a system that creates a depth of effect that may if desired be displayed on curved screens having a width to height ratio that more nearly conforms to the natural field of human vision.

It is still another object of this invention to provide a plurality of curved, meniscus, screen elements which have an infinite number of different distances of separation, so that variable depth effects may be obtained.

It is a further object of this invention to provide a reflecting system that may also be utilized for the showing of regular flat movies or images without any alterations in the reflecting screens.

It is still another object of this invention to provide a novel reflecting screen that greatly enhances the reflection of any projected image, especially when viewed from widely divergent angles.

It is also an object of this invention to provide a novel diffusing screen for rear projection that greatly enhances the viewing of images from said screen.

We have found that such a system is made possible by projecting a pair (or even more) of related images onto an associated pair (or more) of spaced reflecting screens along a viewing axis in such a manner that the two images are visible to the audience and integrated by the viewer into an apparent single image having depth characteristics.

The images are related generally in the sense that the image on the screen closest the audience is a foreground image whereas the image on the screen farthest from the audience is a background image. As a general rule the foreground image will include only that part of the picture which contains the foreground elements being photographed, whereas the background image contains only that portion of the picture which contains the background elements. In other words, the foreground image might include the actors in a particular scene while the background image included the room in which the actors were located, or if outdoors, the scenery that would normally be observed behind the actors although actors or action may appear in either or both images.

The actual spacing of the pair of reflected images appears to play an important role in creating depth quality to the picture as viewed.

The depth effect is emphasized because either image is displaced relatively to the other image as seen by each eye. In other words, the alignment of the two spaced images is seen at a slightly different angle by each eye which creates a different viewed image in each eye very similar to stereo pairs.

In viewing the system of the present invention, if an individual moves his head from side to side, the foreground objects appear to move relative to the background objects in the same manner that near objects appear to move relative to distant objects in normal viewing when the head is so moved. In fact, it is possible for the viewer to move laterally in the theater and thus see behind a solid object on the front screen and view part of the scene on the rear screen that was blocked from view by the front object when the viewer, the front object and rear portion of scenery were in alignment. This is also true of course in natural vision. This is not true in any single plane movie projection system except that there is a similar illusory effect with a pair of polarized stereo images on the screen and a pair of polarized spectacles on the viewer.

The psychology and physiology of normal dimensional vision remains for all practical purposes an undeveloped science at the present time. It is known that the horizontal spacing of the eyes contributes to natural three dimensional viewing but mathematically it can be demonstrated that this spacing has a relatively negligible effect beyond a short distance from the eyes so that other factors must be involved. The stereo systems use this principle, however, and in fact may exaggerate this condition which tends to cause eye strain. It is known that perspective high-lighting or shadowing of the image, motion and peripheral vision contribute to the sense of depth, in addition to the relative displacement of spaced images previously discussed. The present system tends to permit stereo pairs to be produced naturally without eye strain from images formed on spaced planes which taken together with the other natural cues of depth produces the effect of three dimensional images in space without the use of glasses, and capable of non-critical viewing from all angles throughout the theater.

Other factors that are involved in varying degrees are experience, diminution of size in the distance, and interference of foreground objects with the vision of aligned background objects.

It is further known that human sight is readily deceived as shown for example by the basic theory of motion pictures wherein a series of rapidly projected images appear to a viewer as a continuous image.

Thus, it is believed that the present system creates an illusion of depth by a combination of various factors, some of which are inherent at any time for the viewer such as experience and others which are augmented or created by the present system such as an actual spacing between the projected foreground and background images.

The matter of composition of the foreground and background images is one of artistic choice, subject only to the necessary rules for placement of foreground and background images on the appropriately spaced screens. Each image on each plane has its own inherent perspective, high-lighting and other depth cues, which will be suitably combined to give to the whole ensemble an illusion of a complete scene with depth characteristics.

The background image such as an empty room or outdoor scenery, etc., is photographed on a separate film which may be a series of photograhs such as used for movie purposes or may be a single photograph. Then a second photograph on another film is made of individuals, action, or other foreground material, which is taken in a plane immediately in front of the previous background photograph, and all background objects are removed or otherwise blacked out. The material covered in either photograph is generally not to appear in the other and can be eliminated by means of a black screen at the plane of division, physically retouching or blacking out portions of the background image, or any other methods known to the photographic art. Although the invention is being illustrated generally as divided at one plane into two pictures, that is, the foreground and background images, it will be readily appreciated that the scene could be divided at a plurality of planes, assuming, of course, that the projection system subsequently included an associated plurality of reflecting screens for each image produced. Furthermore, it is not necessary that the dividing line between the photographic planes be sharply defined, and in fact the foreground and background may be taken at remote locations as long as the two images blend properly to create a single image for the viewer. In many cases however both background and foreground images will contain actors and action, and these must be suitably combined, as to relative perspective, placement, color, etc.

In certain situations this type of photography will be more economical than that previously used. If it is desired to obtain certain outdoor scenery for a particular story, the scenery including background individuals and action, if any, may be photographed separately by only the camera crew for the background images whereas the foreground action scenes requiring the main actors, directors, and other staff may be done at the regular studios.

The background image is projected onto a rear reflecting screen and the foreground image is projected onto a front screen which are spaced along the viewing axis. Either image may serve only as a border for the other or a separate border image may be projected in the manner well know in the projection art.

The distance between the spaced screens is not a critical factor and may be controlled to some extent by available facilities. It has been found that a suitable distance between the two screens is equal to one-third of the width of the picture reflected from the front screen. Thus for a 30 foot wide picture, the rear screen would be positioned 10 feet behind the front screen.

As illustrated herein the screens are straight and generally parallel to each other or curved with greater curvature in the rear screen so that the ends of each screen tend to meet at the picture edge to form a converging meniscus as viewed on a horizontal section. Any combination of spaced screens is included in the scope of the invention however, i.e., a curved pair may be parallel, or a curved screen may be used with a straight screen, etc. The converging meniscus is the preferred embodiment and will give a sharper and more defined picture edge to those viewers sitting at widely divergent angles and thus allow closer seating with respect to the screen. Also an infinite number of separated "planes" may thus be attained at different portions of the screen ranging from the widest separation at the center to no separation at the edges. This is particularly valuable since greater depth is usually required at the center of action, and lesser depth usually at the sides which, owing to the lesser detail required of peripheral vision, are not as active in the production of the depth illusion. In addition, if the screens remain widely separated at the edges, the viewers at widely divergent angles will tend to see a dark edge along the side of the rear screen opposite from the viewer's position.

It is necessary, however, that the light intensities and color composition vary sufficiently between the foreground and background image so that the background image will not create image conflict with the foreground image. When the contrast is high in the foreground image it has been found desirable to have an intensity at least five times that of the background image but at points where the background image is to be fairly bright, e.g., a bright cloud, airplane, ceiling, etc., the foreground image should not appear at all, that is little or no light should be projected on the foreground screen when the background images are bright and of high contrast. The intensity, of course, must be worked out for the varying circumstances that arise and is partly controlled by the picture composition on the foreground and background films.

In addition to the factors of contrast and intensity there is the factor of color composition. It has been found by experiment that white, high contrast pictures, and those colors known to produce the greatest visibility effect on the human eye, namely, yellow, green, orange and combinations of these with white light, when projected as images on the foreground screen, will generally mask colors with lesser effect on the eyes such as deep blue, deep red, and also the darker shades of green and orange. These colors of lesser visible effect should appear on the background screen where they will be more readily masked by foreground objects of greater color visibility that will appear solid. It is well known that the colors having greatest visibility lie near the middle of the visible spectrum, whereas the colors of lower visibility lie at either end of the spectrum and we have found that the colors ranging from about 490 to 630 Angstrom units and white appear to advantage on the front screen, whereas the visible colors on either side of this range appear to advantage on the rear screen. In addition, spaced small bright objects of any kind, such as white blossoms, which may be agitated by the wind, may appear against relatively high brilliance or high contrast background without confusion.

Where different objects of high contrast, or high intensity or highly visible colors are to appear on both background or foreground screens simultaneously, care must be taken so that they do not overlap from any angle of view in the audience. This usually requires that there be a certain minimum distance separating the two objects laterally and vertically regardless of the depth separation. Where there is sufficient separation there is no requirement for observing any particular limitations on color composition or even intensity. However, where two objects of high contrast and brilliance are eventually to overlap, action can be started with objects on both screens a suitable distance apart as observed along the viewing axis and then the objects brought together on either the foreground or background screen where they may overlap on the same screen without difficulty. Objects may be changed from one screen to the other by having the object appear on the opposing screen as it fades from the former screen. In addition an object may be moved on one screen to a point where both screens contact one another and then the object moves away from the point of contact on the other screen, e.g., at either lateral edge on the converging meniscus screens.

Action, such as the throwing of a ball from a distance toward the audience may also be portrayed effectively by starting the ball for example at an apparent distance of 150′ and allowing it to come forward to an apparent 10′ on the background screen and then continuing from an apparent 10′ to 1′ on the foreground screen. The persistence of vision effect provides continuity in the jump from the background to the foreground screen, and the actual distance between the screens plus the perspective of the images, and the increasing size of the ball as it approaches first on the background screen and then on the foreground screen, all cooperate to produce the depth effect.

Of course, synchronization of foreground and background film strips, according to known techniques must be accurately maintained.

Thus, it may be seen that the director of a movie produced according to the method of this invention, has a wide variety of techniques to obtain the desired artistic effect of depth. Furthermore, many factors will lend themselves to photographic skill and artistic composition in creating the ultimate effect for the audience.

There are various ways which are discussed in detail hereinafter to control the relative intensities of the two reflected images which include light filters, both polarizing and non-polarizing, rear projection of the background image, modified reflecting screens and the adjusting of light intensities at the projection sources.

The accompanying drawings and detailed description thereof illustrate representative embodiments of the present invention and are not to be considered as limitations.

In the drawings:

Fig. 3 is an enlarged plan view of a portion of the front screen of Fig. 2;

Fig. 4 is a diagrammatic view taken on a longitudinal horizontal plane through the center of the preferred embodiment of this invention in which the screens are curved;

Fig. 5 is an enlarged horizontal section taken through the front screen of Fig. 4 and shows the light distribution curve thereof;

Fig. 6 is an enlarged horizontal section taken through the rear screen of Fig. 4 and shows the light distribution curve thereof;

Fig. 7 is a diagrammatic view taken on a longitudinal vertical plane through the center of a modified system showing overhead projection and three planes of reflection;

Fig. 8 is a diagrammatic view taken on a longitudinal horizontal plane through the center of a system similar to Fig. 2 but showing a modified front screen;

Fig. 9 is an enlarged plan view of a portion of the front screen of Fig. 8;

Fig. 10 is a diagrammatic view taken on a longitudinal horizontal plane through the center of a modified system utilizing polarizing elements;

Fig. 11 is a diagrammatic view taken on a longitudinal horizontal plane through the center of a modified system utilizing polarizing elements; and Fig. 12 is an enlarged plan view of the front screen of Fig. 11.

Figure 1:
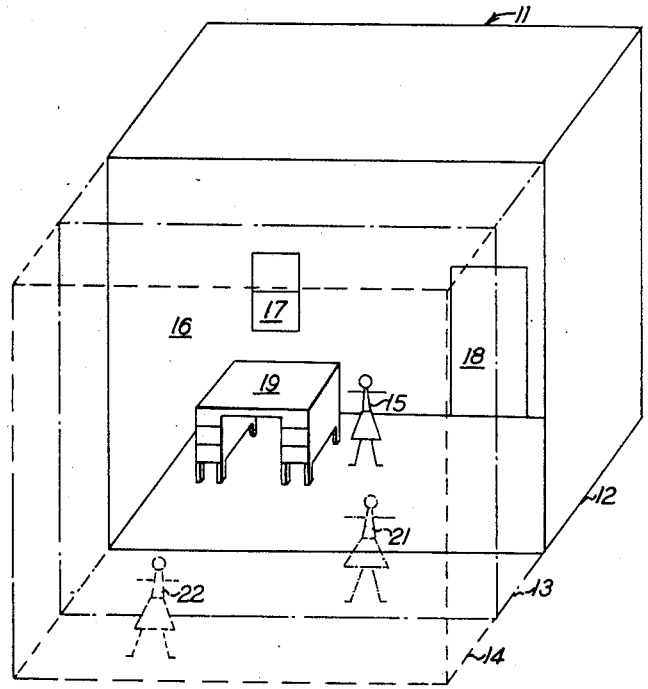
Fig. 1 illustrates a scene divided into a plurality of portions to be photographed separately in accordance with this invention.

Referring to the drawings in detail, this invention is embodied in movie projection systems that utilize spaced viewing screens to create a depth illusion to the viewers.

*Fig. 1*

Fig. 1 illustrates an example of the photographic technique to be used with this invention. A room 11 is shown which is divided along vertical planes into three portions, 12, 13 and 14, the latter two being shown in dot-dash and dash lines respectively. The background or rear portion 12 includes an actor 15, the rear wall 16, a window 17, a door 18, a desk 19, and a portion of the side walls and floor of the room. The portion 12 is photographed separately and then a subsequent photograph is made of portion 13 which includes an actor 21. In photographing portion 13, portion 12 must be blocked off by a black curtain, retouching of the film with an obscuring ink, or other means. Generally speaking, there will be movement of the actor 21. The front portion 14 of the room 11 includes an additional actor 22. This portion may be photographed subsequently to portion 13 if the projection apparatus to be used has three spaced reflecting screens. It has been found preferable, however, to use only two reflecting screens and thus two photographic portions which means that as shown in Fig. 1, portions 13 and 14 would probably be combined into one photographic plane on one film, or portion 14 would be eliminated entirely. In either event, a foreground and a background image will be obtained (and perhaps an intermediate image) for later projection onto associated and spaced screens.

The actors may move from one portion to another with great spatial effect. In such a case, the photography and projection must be so timed that there is a smooth continuity with no visual break between the absence of the actor in one portion and his appearance in the next portion.

It is possible to use the entire room 11 as a background and show only the actor or actors in the foreground. In such a case, the alignment must be carefully considered and the actor may be photographed elsewhere although the audience will combine and interpret the images to position the action in the particular room.

Many other photographic techniques will suggest themselves to those skilled in the art and are considered to be within the scope of this invention.

Figure 2:
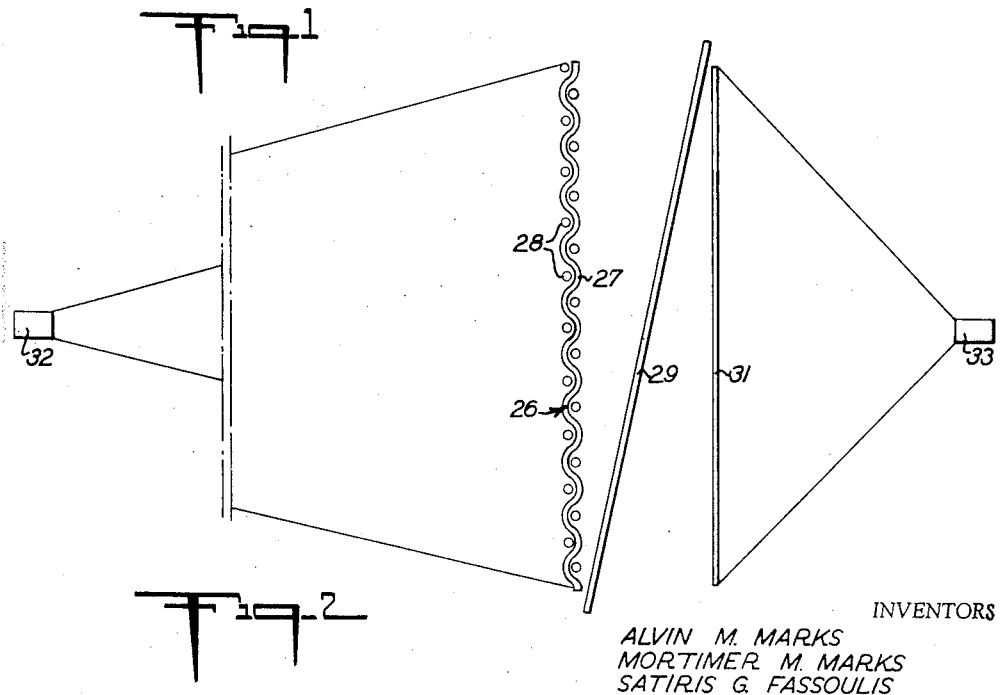
Fig. 2 is a diagrammatic view taken on a longitudinal vertical plane through the center of a projection and reflection system constructed in accordance with this invention.

*Figs. 2 and 3*

Figs. 2 and 3 illustrate an embodiment of screen and projection arrangement for this invention. The front screen 26 is formed of a wire mesh comprising vertical strands 27 and horizontal strands 28 appropriately selected or formed as to the spacings and diameter of the strands to insure the desired predetermined light transmitting and light reflecting qualities. For example, a 30 mesh wire of 0.013" diameter has been found to transmit about 36% and reflect about 54% of the light striking the screen if the reflecting surface is painted with a brilliant white titanium oxide pigment or similar highly reflecting material. Such a painted surface reflects about 85% of the light not transmitted. The back surfaces of the mesh screen are preferably painted black or a similar highly absorbing color. The mesh number of the woven material discussed herein refers to the number of strands per inch each way in the material.

Other wire meshes that have been successfully tested are a 30 mesh wire of 0.017" diameter that transmits about 24% and reflects about 64.5% from a white surface, a 40% mesh wire of 0.0065" diameter that transmits about 50% and reflects about 42.5% from a white surface, and a 40 mesh wire of 0.0135" diameter that transmits about 23% and reflects about 65% from a white surface.

The scope of this invention is intended to include any relative reflective and transmittal areas that can reflect and transmit apparently complete images to the viewers.

We have found that any woven material formed of metal or similar cylindrical strands is an excellent screen for the front screen of spaced projection systems disclosed herein. Furthermore, we have found that these mesh screens are superior for regular screen projection systems that are normally used today. When viewed from divergent angles the woven wire or other round woven strands create an excellent reflecting screen because the round wires reflect the image through a wide viewing angle, reduce specular reflection, and gives an excellent light distribution to the audience.

Spaced immediately behind the front screen is a neutral density filter 29 which transmits about 20% of the light striking it and absorbs the remainder. This filter is positioned at an angle in respect to the front screen so that any slight reflection which may exist from the surface thereof will be reflected at an angle away from the viewer and thus have no tendency to create a "ghost" image coming through the image of the front screen. This filter may be so angled in any direction but it is preferable to have the reflection directed upwardly since it is easier to avoid the entire audience at an upward angle. This angle of reflection can be readily controlled since this is specular reflection as contrasted to diffusion reflection of the screens. This filter may be made from a neutral gray transparent filter material known to the filter art which will be invisible to the audience when properly positioned, and the amount of light transmitted may be varied widely, say, from about 8 to 75%. A similar type filter is marketed under the tradename "Wratten." They are generally manufactured by suspending carbon particles, having a size of about ½ wavelength or less, of yellow light, in a nitrocellulose lacquer. This tends to give a reddish tinge so that a bluish dye such as copper octoate may be added to neutralize the red light.

The scope of this invention is intended to include various light filters that will partially absorb light and use may be made of devices to selectively absorb certain colors of light if colored images are utilized.

Spaced behind the filter 29 and the front screen 26 is the rear screen 31 which is generally parallel to the front screen. This screen includes a special diffusing medium so that light passing therethrough appears to originate on this screen. Screens used for such rear projection are well known, e.g., "Spredlite" manufactured by Marks Polarized Corporation, and an "Eastman" translucent screen, the latter of which utilizes rear projection for microfilm reading. We use a "Spredlite" screen which is a mixture of rubber hydrochloride, polyvinyl acetaldehyde and nitrocellulose which form an incompatible mixture with many surface phases which serve to scatter the light. We have used a screen that transmits about 50% of the light from the rear projector and reflect less than 25% of the light striking it, both being, however, in a diffused state, i.e., the image is viewable from either surface of the screen without regard to the angle of projection onto the screen. Both the light reflection and transmission characteristics may be varied widely, i.e., these screens may transmit from about 40 to 80% and reflect from about 10 to 50%.

A foreground projector 32 projects a foreground image on the screen 26 and a background projector 33 projects a background image onto the rear screen, said background projector being spaced behind the rear screen.

If the front screen is formed of a 30 mesh weave and 0.013" diameter wire which reflects and transmits 54 and 36% of light respectively, and the foreground projection onto the front screen has an intensity of 100 lumens, the reflection back to the audience will have an intensity of 54 lumens while 36 lumens will be transmitted through the screen. On striking the filter 29 which transmits only 20% of the light, 7.2 lumens will pass through to strike the rear screen 31. Since this screen in the example given, reflects about 25% of the light, 1.8 lumens will be reflected from the screen toward the audience. This passes again through filter 29 which thus reduces the intensity to 0.36 lumen which in passing through the front screen 26 is further reduced to 0.12 lumen which has thus become practically negligible and creates no "ghosting" problem. The "ghosting" ratio of the foreground image reflected from the front screen to the foreground image reflected from the rear screen through the front screen is 54 to 0.12 or 450 to 1. At the same time, if the background projector projects an image of 100 lumens onto rear screen 31 of this example, only 50 lumens will pass through the screen. This intensity is reduced by filter 29 to 10 lumens which is again reduced to 3.6 lumens by the front screen 26. Thus the intensity of the images to the viewer are 54 lumens for the foreground image and 3.6 lumens for the background image to give a ratio of about 15 to 1. The overall lighting efficiency of this example is $$100 \times \frac{54 + 3.6}{200}$$

or approximately 28%.

It will be appreciated that changes can be made in the final ratio by altering any of the factors involved here, i.e., the percentage of reflection and/or transmission of the particular elements. Adjustment of the light source may also be made at the projectors to obtain a desirable intensity ratio between the two images. Furthermore, it is possible to entirely eliminate the filter 29 by adjusting other features, e.g., providing for less transmission through the front screen or changing other variables. Actually both screens serve to filter the light, although that is not their primary function. We have found that we can readily eliminate the filter if the front screen transmits from about 10 to 25% of the light, whereas, if the front screen transmits from about 25 to 60% of the light, a filter is generally needed. It is seldom practical to operate with a front screen that transmits over 60% of the light.

As a further example, assume the front screen is formed of a 40 mesh weave and 0.0135" wire diameter which transmits 23% and reflects about 65% of the light. The neutral density filter will be eliminated in this example and the rear screen remains the same as the above example. Then, if 100 lumens is projected from the foreground projection, 23 lumens will be transmitted through the front screen and strike the rear diffusing screen. 25% of 23 or 5.75 lumens will be reflected forward from the rear screen and only 23% of 5.75 or 1.3 lumens will be transmitted through the front screen. The "ghosting" ratio is 65 to 1.3 or about 50 to 1. Now, if the background projector is projecting 100 lumens, 50% or 50 lumens will be projected through the rear diffusing screen, of which 23% or 11.5 lumens will be transmitted through the front screen. In this example, the overall light efficiency is $$100 \times \frac{65+11.5}{200}$$

or approximately 38.3%. The ratio of foreground to background image is 65 to 11.5 or 5.65 to 1. The system illustrated in this example is simpler than that shown in the preceding example in that one element, the neutral density filter is eliminated. This latter system has the further advantage of higher efficiency while maintaining a high enough "ghosting" ratio to avoid interference. However, the light distribution curve is not quite as wide as in the preceding example.

By way of further example, let us assume that a front screen is provided which transmits 10% and reflects 76.5% (90×85%). The neutral density filter is eliminated again and the rear screen is the same as the previous examples. If 100 lumens are projected, 10 lumens pass through the front screen to the rear screen where 2.5 lumens are reflected toward the audience. Then on restriking the front screen, only 0.25 lumen are transmitted to the audience. Thus the "ghosting" ratio is 76.5 to 0.25 or 306 to 1. If 100 lumens are projected from the rear, 50 are passed through the rear screen, of which 10% or 5 lumens pass through the front screen resulting in an intensity ratio of 76.5 to 5 or about 15 to 1. The overall lighting efficiency is $$100 \times \frac{76+5}{200}$$

or approximately 41%.

The above examples are illustrative of the many possible variations in accordance with this invention.

*Figs. 4, 5 and 6*

These figures illustrate the preferred embodiment of the present invention which utilizes a curved screen system. The front screen 76 is formed of wire mesh in the same manner as screen 26 of Fig. 2, except that screen 76 has been curved with the concave surface facing the audience. A foreground projector 77 is provided with a curved film gate 78 which is positioned between the film and the lens, the gate being curved in the direction opposed to the screen on which the image is to be projected. This compensates for distortion in the projected image in a manner known to the prior art.

The rear screen 79 is curved with a shorter radius of curvature than the front screen and spaced immediately behind the front screen so that the associated ends of the screens meet. In projecting images onto this screen, the images may or may not extend to the screen ends although it is usually desirable for the image to be coextensive with the width of the screen.

A rear projector 81 which is also provided with a curved film gate 82 is positioned behind the rear screen for projection thereon. Since, as a general rule, the rear projector is located much closer to its respective screen than the front projector, the light rays from the rear projector strike the rear screen at widely divergent angles, particularly toward the outer edges of the screen. Therefore, the rear surface of the rear screen is provided with a series of vertically extending contiguous Fresnel lenses 83 that redirect the divergent light rays from the rear projector toward the center of the audience. Due both to the curvature of the screen and the fact that more widely divergent rays reach the outer edges of the screen, it is necessary that the Fresnel lenses be so shaped and arranged that they refract the light toward the side edges of the screen through a greater angle as is shown in exaggerated form in Fig. 6. This figure is not shown as curved for drawing convenience since it represents such a small segment of the entire screen. The left end of the figure extends toward the center of the screen while the right end extends toward the screen edge.

The front surface of the rear screen is provided with a series of vertically extending prismatic surfaces 84 which serve to refract the light rays again to emit them from the screen in a more diffuse state so that the distribution curve 87 of the light rays from the screen will show a relatively large percentage of rays emitted at the wider divergent angles instead of being concentrated along an axis passing through the center of the screen and the center of the audience. Although these small individual prisms tend to increase the divergent characteristics of the light distribution curve, it will be noted from Fig. 6 that the light distribution is much different on emerging from rear screen 79 than upon entering the screen. All of the rays before entering the Fresnel lenses tend to diverge in the same direction for one-half of the screen, and many are diverging at such an angle that they would ultimately strike at a point beyond the width of the audience. On emerging from the prismatic surfaces 84, the light rays tend to diverge it is true, but at smaller angles so that the rays will strike within the width of the audience, and further, the divergence is in both directions from normal all over the screen so that the audience will tend to see a better defined image. A diffusing medium 86 similar to that described for screen 31 in Fig. 2 is spread or otherwise coated upon the front surface of the rear screen as shown in Fig. 6.

As will be noted from Fig. 5, the front screen transmits light (assuming the light enters on an axis normal to the screen with a narrow distribution curve 88 in which the intensity of the light has been reduced 50% from that on the normal axis at about 30° on either side of the normal with the screens described hereinbefore of 50 and 36% transmission. The screens of 23 and 27% transmission show a 50% decline in light intensity at about 23 to 24° from normal. It should be pointed out that the distribution curves for reflection and transmission of the wire mesh screens are quite different and that the curve for reflected light is much wider than for transmitted light and has been found extremely desirable for viewing movies.

Since the background image viewed by the audience has been passed through both the rear screen 79 with its wide distribution curve 87 and the front screen 76 with its narrow curve 88, the ultimate distribution curve to the audience represents a compromise between curve 87 and curve 88 which has been found satisfactory.

It will be appreciated that the rear screen 79 may be divided into its separate functional structures without altering the primary effect of the screen. In other words, the series of Fresnel lenses, the series of prisms, and the diffusion layer might form separate and spaced layers. However, for convenience, it is believed desirable to mold such a screen as shown in Fig. 6 as one unit from any of several well known transparent plastics such as methacrylate resins, cellulose acetate and nitrate compounds, and polystyrene resins. It is also possible, of course, to include the diffusing medium within the body of the screen 79.

*Fig. 7*

Fig. 7 illustrates a further modified form of the system that is made possible with the mesh screens of Figs. 2 and 4. The foreground projector, front screen, background projector and rear screen are similar to those shown in Fig. 2 and have been given the same reference numerals. However, an intermediate mesh screen 36 has been positioned between the front and rear screens and an intermediate projector 37 is shown behind the audience near foreground projector 32. A mirror or other specular reflector 38 is positioned overhead and at the proper angle so that an image projected from projector 37 onto the mirror 38 will be reflected to the intermediate screen 36 but will not strike either screen 26 or 31. The film 43 does not run perpendicular to the axis of projection but at an angle thereto which, if suitably related, causes the projected image to appear in focus vertically upon the screen 36. The image on the film is inverted so that it appears upright on the screen 36 after being reversed by the mirror 38. A front filter 39 is provided and is preferably tilted forwardly from the vertical toward front screen 26 so that the intermediate image from projector 37 will not pass through filter 39 until it is reflected from intermediate screen 36 toward the audience. A rear filter 41 may be positioned between the intermediate screen 36 and the rear screen 31 at an angle thereto for the same reason as filter 29 is angled.

If the entire structure as shown in Fig. 7 is utilized, screen 36 will be similar to screen 26 although the relative amount of light transmitted and reflected may be different in determining a system that will not create interference between the various images. If the system is thus used, there will be three images reflected to the audience from different planes which will correspond to the three photographic planes shown in Fig. 1.

If, on the other hand, a theater set-up is such that rear projection is undesirable, the background projector 33, rear screen 31 and filter 41, may be excluded from the structure shown in Fig. 7, and the remainder of the system utilized for two-plane projection. In such a case, screen 36 will generally be an absolute reflector and will not allow light to pass therethrough.

Furthermore, it is possible to use horizontally spaced mirrors to reflect additional images to a plurality of spaced screens with or without rear projection.

Figs. 8 and 9

Figs 8 and 9 illustrate a system generally similar to Fig. 2 except that the front screen 46 is formed of a plurality of vertically spaced strips 47 which may be made of a suitable material, e.g., metal or cellulose acetate, and are white in front and black on the rear. The strips are maintained in position by a transparent backing or by supporting structure beyond the limits of the projected image. The amount of reflection and transmission through the screen is controlled by the relative widths of the spaces and strips. The strips may extend horizontally in parallel vertically spaced relation, but the vertically extending laterally spaced relation is preferred.

Fig. 10

Fig. 10 illustrates a modification utilizing polarizing media. The front screen 51 is formed of polarized material so that it will highly reflect and scatter most of the vertically polarized light rays. However, it will transmit the horizontally polarized rays with little obstruction thereto. A foreground projector 52 projects an image through a polarizing filter 53 which is orientated to transmit only vertically polarized light, this light being reflected and scattered by the screen 51 so that the image is visible to the audience. Positioned behind screen 51 is a polarizing filter 54 which is orientated to pass only horizontally polarized light. Spaced behind the front screen 51 and filter 54 is a rear screen 56 that is suitable for conventional rear-view projection. Positioned behind the rear screen is the background projector 57. It will thus be appreciated that the image from the background projector will be scattered and diffused forwardly from the rear screen 56 and have its horizontal component pass freely through the horizontally orientated filter 54 and the selectively scattering screen 51. The image from the foreground projector 52 is vertically polarized and is strongly scattered forwardly toward the audience on striking the selective scattering medium or front screen 51, but the light transmitted through screen 51 is absorbed by the horizontal polarizing medium 54. Therefore, the pair of images are directed from their associated but spaced screens. The intensity of the images can be controlled by the projectors and the polarizing media.

If it is desired or necessary for both projectors to be at the rear of the audience (see Fig. 11), the only change that is necessary here is to move the background projector to a point near the foreground projector and provide the background projector with a polarizing filter orientated to pass only horizontally polarized light. The image from the background projector will then freely pass through the front screen 51 and the polarizing filter 54 and be reflected from the rear screen back through the front screen structure to the audience.

Figs. 11 and 12

Figs. 11 and 12 illustrate another modification utilizing polarizing media. The foreground projector 61 and the background projector 62 are positioned near each other and provided with a vertically polarizing filter 63 and a horizontally polarizing filter 64, respectively. The rear screen 66 may be one that does not change polarized light on reflection, i.e., a metallized one although an ordinary screen may be used. The front screen 67 which is shown in detail in Fig. 12 is formed of a plurality of spaced vertically extending reflectors 68 which each have attached to their front surface a polarizing strip 69 so orientated that only vertically polarized light will pass therethrough. Immediately behind the spaced vertical reflectors is a polarizing filter sheet 71 which is so orientated that only horizontally polarized light can pass through. Although the filter sheet 71 is shown immediately behind the vertical reflector strips to help maintain their spacing, it may be positioned anywhere between the vertical strips and the rear screen 66, and in fact might be attached to the front of screen 66 if that were more convenient. It may be tilted, if spaced from both screens, in a manner similar to that shown for filter 29 in Fig. 2, to avoid specular surface reflections. In any event, the light rays from foreground projector 61 that strike the polarizing strips 69 are reflected from the vertical reflectors 68 to the audience while the remaining rays that strike the filter 71 are absorbed thereby. Reflectors 68 may comprise aluminum reflecting particles in a transparent coating medium in back of vertically polarizing strips 69. The light rays from background projector 62 being horizontally polarized are absorbed if they strike polarizing strips 69 but pass through the intervening spaces and filter 71 to strike the rear screen 66 and are reflected therefrom back through the spaces between the vertical reflecting strips.

It will be appreciated that the intensity of the background image is reduced somewhat by twice passing through the front screen and further reduction can be effected through the projector or additional filters.

If it is desired to have rear projection of the background image, the rear screen 66 may be a rear-projection screen and the projector 62, with or without its associated polarizing filter 64, moved to the rear of the background screen similar to the arrangement shown in Fig. 10.

Although the description herein refers to horizontally and vertically orientated polarizing media, it is well known that this is the convenient way of describing orientation of polarizing media at angles 90° removed from one another.

Moreover, it is well known that color filters may be utilized in the same manner as polarized media, e.g., a red-green system, but such systems limit the final picture to the colors particularly utilized.

It will be appreciated that all of the modifications described herein have shown at least a pair of projectors and as such they must be mechanically or electrically interlocked so that the related images will be in proper relation. It is possible, of course, in those modifications showing both projectors at the rear of the audience that the foreground and background images be combined onto a single film but occupy successive frames, since the phenomenon of continuity of vision does not allow the human eye to determine the break between the successive frames. Alternatively, the images may be lined up one beside each other on a particular film, all of these methods being known in the projecting art. There must, of course, be attachments to such a single projector for selectively polarizing the different images as required herein or for projecting at least one of the images overhead, as shown for example, in Fig. 7 of the drawings. These, however, are obvious mechanical or optical features to be worked out by those in the art and are not to be construed as limitations on the present invention.

The front screens illustrated herein in Figs. 2, 4, 7, 8 and 11, reflect the foreground image from limited areas of the screen with open spaces between the reflecting areas for viewing the background image from the rear screen. The relative amount of reflecting area to open area may be varied and is an important control of the relative intensity of the two images. The absolute size of the small individual reflecting areas and spaces is also variable but must be retained within the range where each image, if projected alone, would appear as a whole image to the audience from or through the front screen.

Generally speaking, the appearance of the front screen must be such to the audience that the viewers are unable to distinguish a pattern of open areas and reflecting areas when images are not being projected.

The minute detail of film images is controlled by the grain size of the film and is sometimes termed "definition" or "resolution." Objects smaller than the film grain size are not faithfully reproduced which becomes apparent on enlargement of the images. The projection in movie theaters normally is such that the enlargement of the image is fairly close to the limiting point at which the human eye would begin to perceive improperly defined images. Therefore, in order not to lessen the detail of normal movie projection, the open and reflective spaces of the present front screens will generally be at least as small as the detail represented by the projected and enlarged image that resulted from the grain size of the film.

If the individual reflecting or transmitting areas are smaller than the detail of the projected image, they will, of course, serve no effective purpose since the detail of the image cannot be improved. The particular sizes of the reflecting and transmitting areas may, of course, be larger than the detail of the projected image as long as the larger sizes enable the viewer to observe apparent whole images.

Thus the essential standard that is to control our system is the apparent image as seen by the viewer, although for practical purposes, it is well to consider the detail of the projected image as filmed.

Another factor to be considered, especially in those front screens provided with vertically or horizontally extending strips, such as shown in Figs. 8 and 11, is a shadow that will be projected by the width of the strip. Since the light source is larger than the individual strips, each strip will throw a shadow for a certain distance only in the manner in which the moon projects an umbra on the earth during an eclipse of the sun. It is necessary for a given width of strip that the rear screen be spaced far enough so that it does not fall within the projected umbra. It will be appreciated that the penumbra will eliminate the umbra within a fairly short distance. The same phenomenon, although occurring with the wire mesh screens, is not as apparent and in fact has not been observed since even within the range of the umbra there would only appear a series of small dots upon the rear screen which are evidently not visible to the human eye. With the strips, however, the umbra casts an elongated uninterrupted shadow extending completely across the rear screen (if close enough) which is more readily visible to the human eye.

Throughout this application generally and for the claims particularly, the following definitions are intended unless otherwise specified, in using these terms: "Screen" will be used to denote a structure which reflects and/or scatters light for the benefit of the viewers, i.e., a structure on which an image is viewed including both front and rear projection. Transmission of light or images through the front screen is direct regular transmission whereas in a rear-projection system there is diffused transmisison through the rear screen. Where "transmission" is used herein without further description or modification, it is intended to refer to direct regular transmission.

We claim:

1. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a foreground image on the foreground screen and simultaneously independently projecting a background image on a background screen, regulating the projected intensity of the images to cause the intensity of the foreground image to be substantially greater than the intensity of the background image, and arranging a neutral density filter behind the foreground screen at an angle with respect to the foreground screen to prevent a ghost image from coming through the image on the foreground screen, said filter absorbing a major portion of the light impinging thereon, but permitting sufficient light to pass therethrough such that the background image is clearly visible to a viewer located in front of the foreground screen.

2. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a foreground image on the foreground screen and simultaneously independently projecting a background image on a background screen, regulating the projected intensity of the images to cause the intensity of the foreground image to be substantially greater than the intensity of the background image, and arranging a neutral density filter having an absorption of approximately 80 percent behind the foreground screen at an angle with respect to the foreground screen to prevent a ghost image from coming through the image on the foreground screen.

3. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a foreground image on the foreground screen and simultaneously independently projecting a background image on a background screen, controlling the projected contrast and the projected intensity of the images to produce a high contrast, high intensity foreground image and a lower contrast, lower intensity background image, and reducing the intensity of the ghost image of the foreground image to a negligible proportion of the intensity of the foreground image by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

4. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a high intensity middle spectrum colored foreground image on the foreground screen, simultaneously independently projecting a lower intensity end spectrum colored background image on the background screen, and reducing the intensity of the ghost image of the foreground image to prevent a ghost image from coming through the image on the foreground screen by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

5. The method of producing a three-dimensional image as set forth in claim 2, in which the background image is projected from the rear of the background screen.

6. The method of producing a three-dimensional image as set forth in claim 2, in which the background image is projected from the front of the background screen.

7. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a foreground image on the foreground screen and simultaneously independently projecting a background image on a background screen, regulating the projected intensity of the images to cause the intensity of the foreground image to be substantially greater than the intensity of the background image, and absorbing the major portion of the foreground image which is reflected on the background screen to prevent a ghost image from coming through the image on the foreground screen by arranging a neutral density filter having an absorption of approximately 80 percent behind the foreround screen at an angle with respect to the foreground screen such that the filter absorbs a portion of the light passing therethrough and directs any surface reflections of the filter to the side.

8. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a high intensity middle spectrum colored foreground image selected from the colors including white and those in the range of 490 to 630 m$\mu$ on the foreground screen, simultaneously independently projecting upon the background screen a low intensity end spectrum colored background image selected from the remaining visible wave lengths, and reducing the intensity of the ghost image of the foreground image to prevent a ghost image from coming through to the image on the foreground screen by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

9. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a middle spectrum colored foreground image on the foreground screen, simultaneously independently projecting an end spectrum colored background image on the background screen, and reducing the intensity of the ghost image of the foreground image to prevent a ghost image from coming through the image on the foreground screen by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

10. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a high contrast middle spectrum colored foreground image on the foreground screen, simultaneously independently projecting a low contrast end spectrum colored background image on the background screen, and reducing the intensity of the ghost image of the foreground image to prevent a ghost image from coming through the image on the foreground screen by arranging a neutral density filter having an absorption of approximately 80 percent between said screens at an angle to the foreground screen.

11. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a middle spectrum colored foreground image on the foreground screen, simultaneously independently projecting a lower contrast spectrum colored background image on the background screen, and reducing the intensity of the ghost image of the foreground image to prevent a ghost image from coming through the image on the foreground screen by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

12. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a higher contrast middle spectrum colored foreground image on the foreground screen, simultaneously independently projecting an end spectrum colored background image on the background screen, and reducing the intensity of the ghost image from coming through the image on the foreground screen by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

13. The method of producing an apparent three-dimensional image for a viewer comprising providing a foreground screen having reflecting areas with open spaces therebetween of such dimensions as to reflect and transmit apparent whole images to a viewer, providing a background screen, arranging the screens such that the background screen is spaced rearwardly of the foreground screen and such that a viewer located in front of the foreground screen can see apparent whole images when projected on the foreground screen and the background screen, projecting a high intensity, high contrast middle spectrum colored foreground image on the foreground screen, simultaneously independently projecting a lower intensity, low contrast end spectrum colored background image on the background screen, and reducing the intensity of the ghost image of the foreground image to prevent a ghost image from coming through the image on the foreground screen by arranging a neutral density filter having an absorption of approximately 80 percent behind the foreground screen at an angle with respect to the foreground screen to absorb a portion of the light passing therethrough and to direct any surface reflections to the side such that they will not be seen by a viewer located in front of the foreground screen.

References Cited in the file of this patent

UNITED STATES PATENTS

| | | |
|---|---|---|
| 663,266 | Fitch | Dec. 4, 1900 |
| 663,267 | Fitch | Dec. 4, 1900 |
| 1,917,246 | Faris | July 11, 1933 |
| 2,018,690 | Trempalla | Oct. 29, 1935 |
| 2,184,641 | Glanz | Dec. 26, 1939 |
| 2,198,678 | Noaillon | Apr. 30, 1940 |
| 2,268,351 | Tanaka | Dec. 30, 1941 |
| 2,336,508 | Smith et al. | Dec. 14, 1943 |
| 2,510,344 | Law | June 6, 1950 |
| 2,625,852 | Van Orden | Jan. 20, 1953 |

FOREIGN PATENTS

| | | |
|---|---|---|
| 347,184 | France | Dec. 27, 1904 |
| 737,550 | France | Oct. 4, 1932 |
| 859,748 | France | Sept. 16, 1940 |
| 198,428 | Switzerland | Dec. 16, 1938 |